(12) United States Patent
Kelly et al.

(10) Patent No.: US 8,632,708 B2
(45) Date of Patent: Jan. 21, 2014

(54) FIBERGLASS REINFORCED PLASTIC PRODUCTS HAVING INCREASED WEATHERABILITY, SYSTEM AND METHOD

(75) Inventors: Richard M. Kelly, Hermitage, PA (US); James Vincent Gauchel, Hermitage, PA (US); Allison Stright Clapper, Greenville, PA (US)

(73) Assignee: Werner Co., Greenville, PA (US)

( * ) Notice: Subject to any disclaimer, the term of this patent is extended or adjusted under 35 U.S.C. 154(b) by 1412 days.

(21) Appl. No.: 11/881,591

(22) Filed: Jul. 27, 2007

(65) Prior Publication Data

US 2008/0023268 A1 Jan. 31, 2008

Related U.S. Application Data

(63) Continuation-in-part of application No. 11/699,254, filed on Jan. 29, 2007.

(60) Provisional application No. 60/775,304, filed on Feb. 21, 2006.

(51) Int. Cl.
- *B29C 67/00* (2006.01)
- *B29C 70/44* (2006.01)
- *B29C 70/52* (2006.01)
- *E06C 1/00* (2006.01)

(52) U.S. Cl.
USPC ........... 264/136; 264/129; 264/134; 264/137; 264/171.1; 264/171.13; 264/173.11; 264/257; 264/258; 156/166

(58) Field of Classification Search
USPC ............ 264/136, 137, 171.1, 171.13, 171.24, 264/172.11, 172.16, 129, 134, 173.11, 257, 264/258; 182/194; 156/166
See application file for complete search history.

(56) References Cited

U.S. PATENT DOCUMENTS

| | | | |
|---|---|---|---|
| 3,684,622 A * | 8/1972 | Goldsworthy | 156/441 |
| 4,681,722 A * | 7/1987 | Carter et al. | 264/171.11 |
| 4,822,439 A | 4/1989 | Gauchel et al. | |
| 4,929,651 A | 5/1990 | Gauchel et al. | |
| 5,322,582 A | 6/1994 | Davies et al. | |
| 5,489,481 A | 2/1996 | Hager et al. | |
| 5,626,643 A | 5/1997 | Woodside et al. | |
| 5,747,075 A | 5/1998 | Gauchel et al. | |
| 5,783,013 A * | 7/1998 | Beckman et al. | 156/180 |
| 5,914,080 A | 6/1999 | Gauchel et al. | |
| 5,935,498 A * | 8/1999 | Vockel et al. | 264/136 |
| 6,048,427 A * | 4/2000 | Gauchel et al. | 156/180 |
| 6,093,359 A | 7/2000 | Gauchel et al. | |
| 6,114,007 A | 9/2000 | Brandon et al. | |
| 6,179,945 B1 * | 1/2001 | Greenwood et al. | 156/171 |
| 6,207,726 B1 * | 3/2001 | Ohtani et al. | 522/26 |
| 6,322,893 B1 | 11/2001 | Gauchel et al. | |
| 7,095,428 B2 | 8/2006 | Harrison | |
| 2004/0067711 A1 * | 4/2004 | Bliton et al. | 442/394 |

* cited by examiner

*Primary Examiner* — Atul P. Khare
(74) *Attorney, Agent, or Firm* — Ansel M. Schwartz

(57) ABSTRACT

A method for making a ladder rail includes the steps of using a central reinforcement to carry structural resin and maintain distribution of structural resin through an impregnation process, wherein the central reinforcement is fed to a curing die at a rate of greater than 5 ft/min. There is the step of forming the rail.

12 Claims, 12 Drawing Sheets

SECTION C

SECTION B

SECTION A

FIBERGLASS REINFORCED PLASTIC PRODUCTS HAVING INCREASED WEATHERABILITY, SYSTEM AND METHOD

This application is a continuation-in-part of application Ser. No. 11/699,254, filed Jan. 29 2007, which claims the benefit of U.S. Provisional Application No. 60/775,304 filed on Feb. 21, 2006.

FIELD OF THE INVENTION

The present invention relates to the pultrusion of rail. More specifically, the present invention relates to the pultrusion of rail using resin without filler to increase the weatherability of the rail or with filler to produce rail at a rate of greater than 5 ft/min.

BACKGROUND OF THE INVENTION

Fiberglass reinforced plastic ladder rails are traditionally produced by the pultrusion process. In this process, reinforcements are gathered systematically, impregnated with a cureable resin, formed into a shape and cured continuously by the addition of heat in a metallic die. The process has been in existence for over fifty years with little change in the basics design of the process. During the past ten years, the federal government has through the Environmental Protection Agency and through Air Quality Standards caused the operators of the pultrusion process to reassess the methods they use to handle VOC containing resins in the pultrusion process. This has evolved several different methodologies for impregnating reinforcement that minimize the contact of the impregnating resin with the atmosphere and also reducing the exposure of workers to the volatile chemicals.

BRIEF SUMMARY OF THE INVENTION

The present invention pertains to climbing products containing rails decorated using veil products colored, patterned, painted or in combination with marking methods such as company names and logos and resin formulation designed to withstand exposure to UV radiation with minimal change in appearance which create specific appearances for applications, enhance weathering performance, and facilitate processing efficiency.

The present invention pertains to a combination of a filler free resin and coated veil systems to create a synergistic weather resistance surface with self contained color, pattern, picture, logo or combination of said same for climbing products. Resins can be generically of polyester, acrylic, epoxy, urethane, acrylate, and or combinations of said resins. Veils may be dyed, printed, pigmented, transfer coated or combinations of said methods familiar to one skilled in the state of the art. Veil compositions may be glass, polyester, paper, jute or other dispersed fiber systems capable of maintaining mechanical and dimensional performance throughout the ladder section production process.

The present invention pertains to a method for continuously placing specific amounts of internal structural resin into a product by balancing the volume flow of input internal structural resin in an enclosed impregnation system to the size of the product and the line speed of the manufacture process.

The present invention pertains to the use of a central reinforcement to carry structural resin and maintain distribution of structural resin through the impregnation process to the curing die.

The present invention pertains to the use of specific reinforcement systems and impregnation processes to self limit the amount of structural resin introduced into a laminate during the impregnation process by using the absorptivity and compression characteristic of the internal reinforcement to carry said resin through the process and transfer said resin to adjacent unwet structural layers prior to the curing process of the resin in the manufacturing process.

The present invention pertains to a method for changing part color without stopping production which minimizes total raw material lost and product lost to mixed appearance.

The present invention pertains to a method of folding veils such that the crossovers between veils are located and controlled at a prescribed positions on the part.

The present invention pertains to a method for continuously producing on separate streams of a single machine colored parts of differing color.

The present invention pertains to a method for continuously producing parts with differing colors in controlled positions around the perimeter of the said parts.

The present invention pertains to a method for continuously producing on separate streams of a single machine colored parts of differing color while continuously producing parts with differing colors in controlled positions around the perimeter of the said parts.

The present invention pertains to a system for producing components. The system comprises means for producing rail having a delta E less than 20 with a 60 degree gloss, as measured by a 100 gloss meter, of greater than 70 after 1000 hours of accelerated weathering in a QUV chamber using bulb A with an ASTM cycle. The system comprises means for cutting the rail.

The present invention pertains to a ladder rail. The rail comprises a web. The rail comprises a first flange extending from the web. The rail comprises a second flange extending from the web. The web and first and second flanges are made of fiberglass and resin and together form the rail having a delta E less than 20 with a 60 degree gloss, as measured by a 100 gloss meter, of greater than 70 after 1000 hours of accelerated weathering in a QUV chamber using bulb A with an ASTM G154 cycle 4.

The present invention pertains to a method for producing components. The method comprises the steps of producing rail having a delta E less than 20 with a 60 degree gloss, as measured by a 100 gloss meter, of greater than 70 after 1000 hours of accelerated weathering in a QUV chamber using bulb A with an ASTM G154 cycle 4. There is the step of cutting the rail.

The present invention pertains to a system for producing a ladder rail. The system comprises a pultrusion system. The pultrusion system comprises a prewet which wets a middle mat with a resin and filler. The pultrusion system comprises an impregnator which compresses a first veil outer layer, a second veil outer layer, a first mat layer, a second mat layer, a first roving layer and a second roving layer with the middle mat, and which wets only the first veil outer layer, the second veil outer layer, the first mat layer and the second mat layer with resin without filler.

The present invention pertains to a ladder rail. The rail comprises a first veil layer. The rail comprises a first mat layer having a first color in contact with the first veil layer. The rail comprises a first roving layer in contact with the first mat layer. The rail comprises a middle mat layer in contact with the first roving layer. The rail comprises a second roving layer in contact with the middle mat and together the middle mat and first roving layer having a second color. The rail comprises a second mat layer having the first color in contact with the second roving layer. The rail comprises a second veil layer in contact with the second mat layer.

The present invention pertains to a method for making a part. The method comprises the steps of using a central reinforcement to carry structural resin and maintain distribution of structural resin through an impregnation process of material to a curing die at a rate of greater than 5 ft/min. There is the step of forming the part.

The present invention pertains to a method for producing components. The method comprises the steps of producing rail at a rate of greater than 5 ft/min having a delta E less than 20 with a 60 degree gloss, as measured by a hunter gloss meter, of greater than 70 after 1000 hours of accelerated weathering in a QUV chamber using bulb A with an ASTM G154 cycle 4. There is the step of cutting the rail.

The present invention pertains to a system for producing a ladder rail. The system comprises a pultrusion system that produces product at a rate of greater than 5 ft/min. The pultrusion system comprises a prewet which wets a middle mat layer with a resin and filler. The pultrusion system comprises an impregnator which compresses a first veil outer layer, a second veil outer layer, a first mat layer, a second mat layer, a first roving layer and a second roving layer with the middle mat layer, and which wets only the first veil outer layer, the second veil outer layer, the first mat layer and the second mat layer with resin to form the product.

The present invention pertains to a system for producing components. The system comprises means for producing rail at a rate of greater than 5 ft/min having a delta E less than 20 with a 60 degree gloss, as measured by a hunter gloss meter, of greater than 70 after 1000 hours of accelerated weathering in a QUV chamber using bulb A with an ASTM cycle. The system comprises means for cutting the rail.

The present invention pertains to a ladder rail. The rail comprises a first veil layer. The rail comprises a first mat layer which has a first color in contact with the first veil layer. The rail comprises a first roving layer in contact with the first mat layer. The rail comprises a middle mat layer in contact with the first roving layer. The rail comprises a second roving layer in contact with the middle mat layer and together the middle mat and first roving layer have a second color. The rail comprises a second mat layer which has the first color in contact with the second roving layer. The rail comprises a second veil layer in contact with the second mat layer. The first veil layer, and the second veil layer have resin with filler that includes clay and CaCO3.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 25:
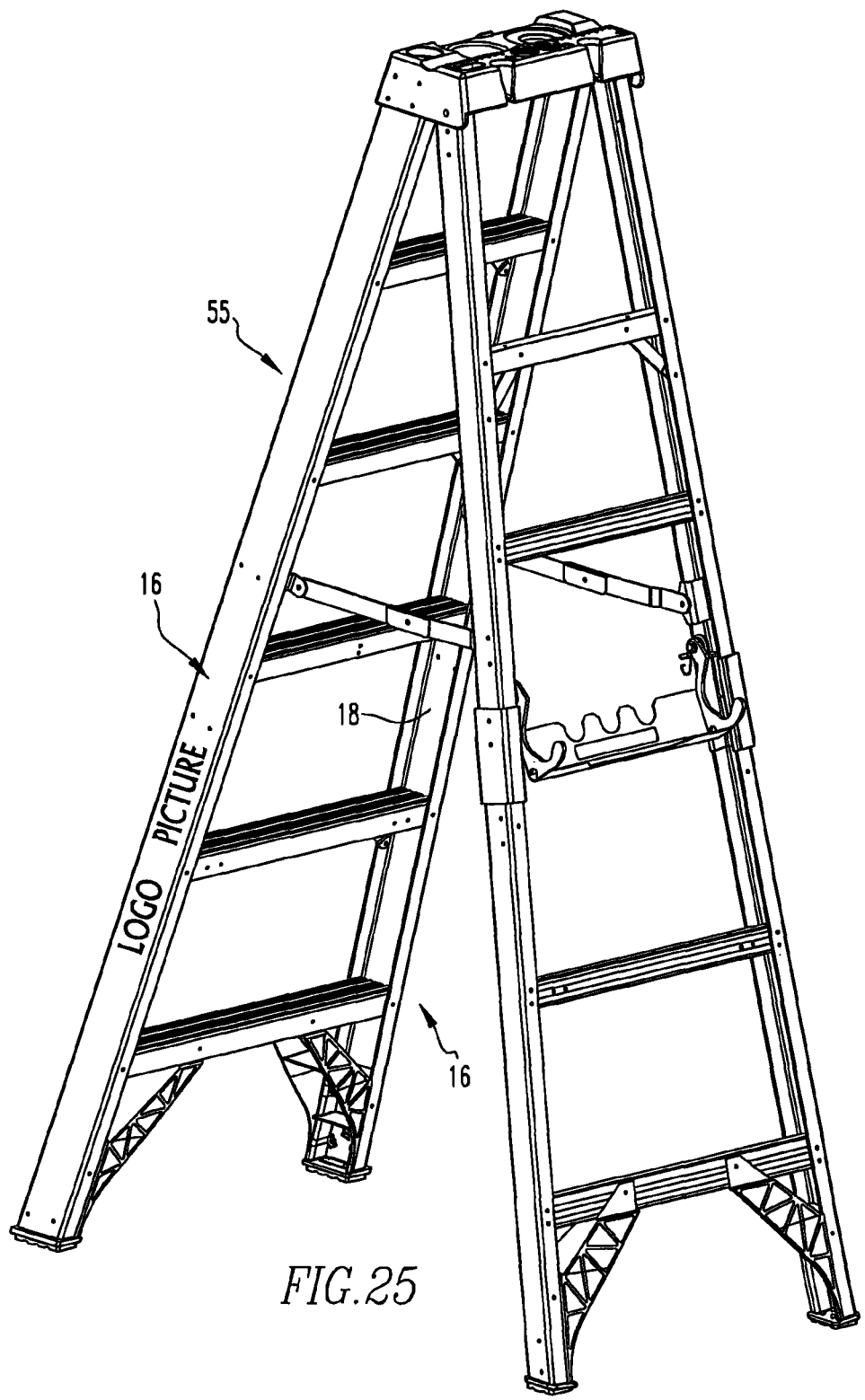
FIG. 25 shows a climbing product of the present invention.

Referring now to the drawings wherein like reference numerals refer to similar or identical parts throughout the several views, and more specifically to FIG. 25 thereof, there is shown climbing products 55 containing rails 16 decorated using veil products colored, patterned, painted or in combination with marking methods such as company names and logos and resin 14 formulation designed to withstand exposure to UV radiation with minimal change in appearance which create specific appearances for applications, enhance weathering performance, and facilitate processing efficiency. A logo and/or a picture is part of the veil itself.

The present invention pertains to a combination of a filler free resin 14 and coated veil systems 10 to create a synergistic weather resistance surface with self contained color, pattern, picture, logo or combination of said same for climbing products. Resins 14 can be generically of polyester, acrylic, epoxy, urethane, acrylate, and or combinations of said resins 14. Veils may dyed, printed, pigmented, transfer coated or combinations of said methods familiar to one skilled in the state of the art. Veil compositions may be glass, polyester, paper, jute or other dispersed fiber systems capable of maintaining mechanical and dimensional performance throughout the ladder section 52 production process.

The present invention pertains to a method for continuously placing specific amounts of internal structural resin 14 into a product by balancing the volume flow of input internal structural resin 14 in an enclosed impregnation system 10 to the size of the product and the line speed of the manufacture process.

Preferably, there is an enclosure design, such as an injection die that continuously distributes the resin 14 in planned uniform or non-uniform volume across the width of the part 40 to match the volume of reinforcement in the specific locations throughout the cross section of the part 40.

The present invention pertains to the use of a central reinforcement to carry structural resin 14 and maintain distribution of structural resin 14 through the impregnation process to the curing die.

The present invention pertains to the use of specific reinforcement systems 10 and impregnation processes to self limit the amount of structural resin 14 introduced into a laminate during the impregnation process by using the absorptivity and compression characteristic of the internal reinforcement to carry said resin 14 through the process and transfer said resin 14 to adjacent non-impregnated structural layers prior to the curing process of the resin 14 in the manufacturing process.

Preferably, the method ensures placement of said resin 14 such that the surface resin 14 and any structural resins 14 do not intermix yet co-cure to a laminate whose structural and functional properties are sufficient for use in climbing products (ladders).

The present invention pertains to a method for changing part 40 color without stopping production which minimizes total raw material lost and product lost to mixed appearance.

Preferably, the color is changed by introducing veils of differing color around the perimeter of the part 40. Preferably, said veils are introduced without attaching said veils to the veils of the previous color(s) in the process.

The present invention pertains to a method of folding veils such that the crossovers between veils are located and controlled at prescribed positions on the part 40.

The present invention pertains to a method for continuously producing on separate streams of a single machine colored parts 40 of differing color.

The present invention pertains to a method for continuously producing parts 40 with differing colors in controlled positions around the perimeter of the said parts 40.

The present invention pertains to a method for continuously producing on separate streams of a single machine colored parts 40 of differing color while continuously producing parts 40 with differing colors in controlled positions around the perimeter of the said parts 40.

The present invention pertains to a system 10 for producing components. The system 10 comprises means for producing rail 16 having a delta E less than 20 with a 60 degree gloss, as measured by a hunter gloss meter, of greater than 70 after 1000 hours of accelerated weathering in a QUV chamber using bulb A with an ASTM cycle. The system 10 comprises means for cutting the rail 16.

The present invention pertains to a ladder rail 16. The rail 16 comprises a web 18. The rail 16 comprises a first flange 20 extending from the web 18. The rail 16 comprises a second flange 22 extending from the web 18. The web 18 and first and second flanges 20, 22 are made of fiberglass and resin 14 and together form the rail 16 having a delta E less than 20 with a 60 degree gloss, as measured by a hunter gloss meter, of greater than 70 after 1000 hours of accelerated weathering in a QUV chamber using bulb A with an ASTM G154 cycle 4.

The present invention pertains to a method for producing components. The method comprises the steps of producing rail 16 having a delta E less than 20 with a 60 degree gloss, as measured by a hunter gloss meter, of greater than 70 after 1000 hours of accelerated weathering in a QUV chamber using bulb A with an ASTM G154 cycle 4. There is the step of cutting the rail 16.

The present invention pertains to a system 10 for producing a ladder rail 16. The system 10 comprises a pultrusion system 10. The pultrusion system 10 comprises a prewet 24 which wets a middle mat with a resin 14 and filler. The pultrusion system 10 comprises an impregnator 26 which compresses a first veil outer layer 12, a second veil outer layer 28, a first mat layer 30, a second mat layer 32, a first roving layer 34 and a second roving layer 36 with the middle mat, and which wets only the first veil outer layer 12, the second veil outer layer 28, the first mat layer 30 and the second mat layer 32 with resin 14 without filler.

The resin 14 in the prewet 24 can be the same or different, i.e., color, from the resin 14 in the impregnator 26.

Preferably, the first and second outer veil layers contain all the colorant needed to color the ladder rail 16. Preferably, the first and second outer veil layers combined with the resin 14 without filler form a corrosion and weathering barrier such that said ladder rail 16 maintains a delta E of less than 20 and 60 degree gloss of 60 after exposure to 1000 hr of ASTM G154 Cycle 4 irradiation in a QUV accelerated weathering machine.

The first and second outer veil layers can contain more than one color. The first and second outer veil layers can contain pictures and printed letters or words.

The present invention pertains to a ladder rail 16. The rail 16 comprises a first veil layer. The rail 16 comprises a first mat layer 30 having a first color in contact with the first veil layer. The rail 16 comprises a first roving layer 34 in contact with the first mat layer 30. The rail 16 comprises a middle mat layer 38 in contact with the first roving layer 34. The rail 16 comprises a second roving layer 36 in contact with the middle mat and together the middle mat and first roving layer 34 having a second color. The rail 16 comprises a second mat layer 32 having the first color in contact with the second roving layer 36. The rail 16 comprises a second veil layer in contact with the second mat layer 32.

Preferably, the first mat layer 30, and the second mat layer 32 have resin 14 without filler; and the first and second roving layers 34, 36 and the middle mat layer 38 have resin 14 with filler.

In the operation of the invention, colored veil offers a low cost approach for meeting commercial objectives of improved fiberglass product performance, particularly that of weathering characteristics.

Colored veil advantages relative to ladder and climbing products that use reinforced fiberglass plastic (FRP) components are centered on improved weather resistance and the reduction of manufacturing change-over costs from color to color with traditional pigmented resin 14 processes. An uncolored, unfilled clear resin system 10 is used together with pre-colored veil to produce the composite component in substitution for color-pigmented resin 14 with un-colored veil.

Manufacturing equipment and tooling configurations that provide separate resin 14 delivery to the periphery of the composite's cross section and to the cross section's interior is utilized to:

1. Improve weathering characteristics by using higher performance resin 14 formulation on the component's exterior.
2. Lower cost by using standard resin 14 formulations in the interior cross sectional area and reductions in manufacturing change-over time and associated material scrap.
3. Provide flexible manufacturing for prototype samples, marketing promotions, and special orders.
4. Provide efficiencies of demand to balance production lines where a production machine can pultrude composite streams in different, separate colors simultaneously, rather than limited to a single color from a common pigmented resin 14 bath supply.
5. Provide pre-colored and pre-printed veil which allows introduction of graphics, patterns, color combinations, logos, and brand names into the product's appearance.

Process Description

The methods are generically some form of closed or partially closed impregnation bath or die run at either ambient or elevated pressure. These "injection" dies have been disclosed in various patent literature (see US Pat. No. 6,048,427 by Gauchel et. al.; US Pat. No. 5,783,013 by Beckman and Gauchel; US Pat. No. 5,747,075 by Gauchel et. al.; US Pat.

5,322,582 by Davies et. Al.; and US Pat. 3,684,622 by Goldsworthy; all of which are incorporated by reference herein, and which describe Pultrusion). Each of these patents teaches methods for placing resin 14 or resins 14 into or uniformly through the part's 40 cross section. Davies discusses using discrete roving packets to selectively place a second resin 14 locally within a part 40. Gauchel and Beckman discuss methods for selectively impregnating various parts 40 of the reinforcement package by either separate die technology of separate weir 42 technology. Goldsworthy uses multiple impregnation ports and internal injection systems to place resin 14 into the reinforcement pack. In-all cases no attempt is made to ensure that the multiple resins 14 are maintained in discrete layers through the thickness of part 40 along the length of the part 40.

In this invention, the teachings referenced above are improved by creating mass flow conditions which cause multiple resins 14 to remain in specific areas within the part 40 (placement of resin 14 is accomplished by contacting resins 14 with selected reinforcements in the stacking sequence (donor layers) of the part 40, i.e. the middle mat, supplying the resin 14 at a known rate sufficient to remove the air from the reinforcement when it is compressed and compressing the reinforcement to a given thickness distribution along the width of the mat. For samples of constant cross section and glass content the impregnated reinforcement would be compression uniformly across the width. The degree of compaction is determined mathematically by calculating the amount of resin 14 needed to fully saturate the reinforcement at the thickness it will be compacted to in the final part 40 plus the amount of resin 14 needed to transfer from the preimpregnated mat to the adjacent layers (acceptor layers). This amount is determined from the amount of glass in the acceptor layers and the final thickness of the acceptor layers in the cured part 40. (All glass roving layers are optimally impregnated with standard density resin 14 at a weight percent of approximately 75%. Glass Mat layers compacted to their final thickness in the die are fully saturated at about 35% by weight.)

Transfer to the acceptor layer is only accomplished as the reinforcing pack is compressed in the forming process prior to introduction of the topcoat in the injection die. The design of the forming station and impregnation die is such that the reinforcement pack is compressed to within 0-5 mils of the thickness of the part 40 in the curing die prior to addition of the second resin 14.

If more than two resins 14 are used, the thickness would be compressed such that layers to be impregnated by the first resin and the donor layer of the second resin are compressed to a calculated thickness such that the first layer and its receptor layers are impregnated with the initial resin 14 and the second donor layer is compressed to the proper thickness to accept the proper amount of resin 14 to impregnate itself plus its acceptor layers. The process is repeated depending on the number of resins 14 that are being introduced to the part 40.

Along with process improvement, a materials modification of using a combination of surfacing veil to which has been added dies/pigments/paints to selectively or uniformly color the part's 40 exterior and a resin 14 formula designed from resin 14 types known to have the combination of weathering performance and processing capability in the pultrusion process and additive packages which minimize degradation of the resin 14 on weathering and placing said resin 14 a veil on the exterior of the part 40 to create a part 40 with weathering characteristics superior (as measured by change in appearance—gloss and color change (delta E value from spectrophotometer)—after exposure to known quantities of light in a QUV-accelerated weathering apparatus to the current state of the art for materials produced from the pultrusion process.

While modified surfacing veils have been used to develop functional characteristics in pultruded parts, they have not be used with high performance unfilled resins 14. The reason was that to use the high performance resins 14 throughout the part thickness was not cost effective. But if the modified veil and high performance resins 14 are used with the process modifications of this invention, only a thin layer of high performance resin 14 needs to be used to create a functionally weathering layer, see above description of resin 14 placement method. Because this invention allows varying the thickness of the layer of reinforcement available for impregnation by the clear outside corrosion resin 14 by either selection of the thickness of the outside reinforcement and/or control of the amount of inside resin(s) 14 placed on the donor layer(s) of the part 40, a cost effective laminate may be obtained which has better measurable response to accelerated weathering while maintaining the needed structural performance for climbing products as measured by performance in ANSI 14.5 testing protocols, incorporated by reference herein.

Other aspects of this invention relate to the synergy between the use of colored veil, selective resin 14 placement and process techniques. These interactions create improvements in scheduling flexibility, product diversity and manufacturing efficiencies which lead to increased productivity. One example of the improvement in process scheduling that occurs when parts 40 of varying color can be run simultaneously on one machine. Currently all streams on a given pultruder run parts 40 with the same color resin 14 supplied to each stream from a single holding tank-excess resin 14 is collected and recycled to the input holding tank and reused. To run individual steams with different color resin 14 multiple holding pots with separate pumps and resin 14 recycle hardware would be required. Not only would this be expensive but because of the limited space on the machine difficult and cumbersome to the operator. Introducing colored veil allows the existing hardware to be used because only non-colored resins 14 are required. Each stream on a multi-steam machine is capable of running its own color as determined by the color of this input veil used in the part 40.

Likewise products with multicolors, patterns or pictures can be produced using the appropriate incoming veil manufactured by standard veil printing and dying techniques to colors which when put through the rail 16 making process produce colors that are selected to match standards desired by marketing for specific ladders—example a deep blue for the electricians ladder actually starts with a veil whose color appears to be too red and too purple to create the desired color. Color shifts through the process are determined experimentally and vary by color.

Changing colors also becomes extremely easy. Changing standard veils is commonly done during processing. The veils are allowed to run out in a random manner and are replaced as needed. This can be done on the fly with little or no scrap and no down time. With colored veils the only modification is that if a color change is occurring all veils on the part 40 need to be changed within a small distance of each other to minimize scrap do to multicolored parts 40. Otherwise, no shutdown for cleaning or transfer of one colored resin 14 out of the system 10 and placement of the new color into system 10 is required—no scrap or unused resin 14—no loss of productivity while the resin 14 change occurs—no mess associated with cleaning guides 48 and resin 14 return pans etc.

With proper guidance methods, veils do not even require attachment between ends of preceding and subsequent veils, thus eliminating more work for the machine operator.

If entire operations are converted to this process, other synergies occur in the mixing and resin 14 delivery systems which further improve the cost effectiveness of the product. One topcoat and one structural resin 14 formula can be used for all colors and shapes with the colored veil process we would have only one prewet 24 formula and one topcoat formula for all colors and locations. The mix room would make prewet 24 and topcoat only not multiples of each. Thus, knowing the relative requirements of each resin 14 for each part 40, resin 14 mixing volumes may be optimized so that minimal excess of any resin 14 is obtained during the mixing operation. All topcoats are equal and can be sent to any line. Likewise, all structural resin 14 batches are the same and can be utilized by every machine. No more having too much blue and not enough yellow to meet a varying demand. Color is now dependant on long term stable veils systems capable of being inventoried without fear of loss by reaction.

Cleanup between color changes is virtually eliminated. Preventive maintenance on lines and pumps replaces requirements for purging systems with solvent and unpigmented resins 14 in order to clean lines in order to run a light color after a dark one.

Running colored or printed veils requires ungrading the quality of reinforcement placement during the pultrusion process. Veil placement must be maintained constant so that any overlaps occur in the proper location. The upside of the placement issue is that with proper placement techniques veils no longer need to be as wide. Current veils are extra wide to take into account lateral shrinkage and to make sure there is a bunching of veil at the tips of flanges. This means that the standard veils are between 0.5 and 1.0 wider than need to cover the perimeter of the part 40. Colored veils shrink less during the process and the placement is more consistent because a veiless surface cannot be allowed to occur. Bunching is also not wanted on the tipps with colored veil because it causes the tips to be a different color than the rest of the part 40. The consistent placement is created with an added veil folding device(s) which allow the veil to fold only one way. Reducing veil width creates a measurable materials savings.

In regard to weathering cycle, see ASTMG154 Cycle 4, incorporated by reference herein. Relative weathering performance for yellow part

| | |
|---|---|
| 1. Previous standard overcoat Delta E = 40 | 1000 hrs QUV |
| 2. Standard Through color/RI = 35 | |
| 3. Colored veil with stand resin = 35 | |
| 4. Colored veil with no filler resin = 12 (the present invention) | |

1000 hrs QUV=1 year south Florida for the cycle we are using
Delta E above 20 is cut off for acceptable performance
Processing with colored veil takes color change from multiple hours to about a minute
Colored veil allows different colors on same machine simultaneously Colored veil allows different colors on same part.
The gloss of the rail 16 is greater than 70.

Definitions

Donor layer: A layer of reinforcement(s): the donor layer may consist of multiple reinforcements such as mat plus roving or multiple mats but is normally a single mat that is impregnated directly with resin 14 in an uncompressed or partially compressed state such that the amount of resin 14 transferred to the layer is sufficient to fully impregnate itself plus impregnate the acceptor layer(s) adjacent to it in the cured laminate. The characteristics of a donor layer are that it is uniformly compressible, compressibility versus pressure is known and reproducible, structure is such that it can accept and give up resin 14 easily as compressed, and that its structure is such that it will maintain a non uniform resin 14 distribution over the time frame of the impregnation, combination and forming processes so that a distributed resin 14 volume may be transferred to the acceptor layers.

Acceptor layer: A layer of reinforcement usually roving which is put into the combination and forming process in an unimpregnated or partially impregnated state. Impregnation of the acceptor level occurs as it is combined with a donor layer and the donor layer/acceptor layer(s) package is compressed in the forming and final impregnation stations of the process.

Combination process: A segment of the total pultrusion process that brings layers of reinforcement together into a reinforcement package. The combination process normally is placement only with little or no compaction of the layers.

Forming process: A segment of the total pultrusion process that takes the fully combined reinforcement package (including impregnated donor layers) and shapes them from a flat or slightly curves shape to a shape similar to the shape of the curing die but slightly larger in all dimension.

Final Impregnation Process: A segment of the total pultrusion process that compacts the reinforcement package causing the donor layers to release resin 14 to the acceptor layers and brings the reinforcing package to the size of the curing die, and simultaneously adds topcoat resin 14 under pressure and removes and remaining air from the reinforcement package. This results in a fully impregnated reinforcement package with donor resin 14 distributed throughout the donor acceptor layers and topcoat resin 14 distributed in the outside topcoat containment layers (normally this would be the veil and the outside mat layers of our standard seven layer laminate, but we could use other types of reinforcements under the veil to contain the topcoat resin 14)

Pultrusion Process

Sizing the Opening in the Prewet 24 Die
1. What is the amount of resin 14 required to fully saturate a layer of given thickness for common pultrusion reinforcements?
   Requires knowing the volume occupied by the reinforcement layer in a cured pultrusion laminate

| Reinforcement Type | Thickness in Pultruded laminate (in) |
|---|---|
| 1 oz continuous filament mat | .020 |
| .625 oz Holinee Madiglioni Mat | .020 |
| .75 oz continous filament Mat | .017 |
| uniform layer of roving (250 yield) | .0224 | and it also requires knowing the percentage of the reinforcement layer the reinforcement actual occupies (the rest is occupied by the resin 14)

| Equilibrium Glass Volume fraction In pultruded layer | |
|---|---|
| 1 oz continuous filament mat | .23 |
| .625 oz Holinee Madiglioni Mat | .151 |
| uniform layer of roving (250 yield) | .60 |

One then can calculate the split in thickness between reinforcement and resin 14.

| Thickness occupied by reinforcement And resin 14 in pultruded layer | | |
|---|---|---|
|  | Reinforcement (in) | Resin (in) |
| 1 oz continuous filament mat | .0046 | .0154 |
| .625 oz Holinee Madiglioni Mat | .0031 | .0169 |
| uniform layer of roving (250 yield) | .00134 | .009 |

2. From the above data one can now size the preimpregnation station exit slot 50. If a 0.625 Holinee mat is used as a donor layer for two acceptor layers of 250 roving, the Holinee mat must contain on exit of the preimpregnation chamber enough resin 14 to fully saturate all three layers. This would be 0.0154 in of resin 14 for the mat itself plus 0.018 in of resin 14 for the roving layers (2×0.009). Thus, the total thickness of the mat on exit of preimpregnation chamber should be 0.0031 for the glass in the mat+0.0334 for the resin 14=0.0364 inches. Since Holinee mat in the unimpregnated state is 0.079, the mat will accept and hold this amount of resin 14 with minimal transfer of resin 14 during the combination and forming process. Only when compaction of the mat to less than a thickness of 0.0364 inch will resin 14 transfer from the donor mat to the acceptor rovings. Formers 46 are designed with a 1.5 factor on all dimensions so that the thickness available in the former 46 for a holinee layer is 0.020×1.5=0.0300. Thus, thirty-three percent of the total transfer to the acceptor roving takes place prior to the final impregnation chamber.

Composition for Best practice for this invention:
1. Use of 0.625 oz/sq ft Holinee mat as central donor.
2. Use of 2 1 oz/sq ft Continuous Filament Mats (from either OC or CSG) as Outside structural layers
3. Use of 2 layers of continuous roving (250 yd/lb yield—multiple sources) placed such that each layer contains 11 rovings per linear inch of width
4. Use of 2 layers of dyed polyester veil from Precision Fabrics Group (PRG) each layer weighs 1.65-2.5 oz/square yd. depending on color. For orange a weight of 1.75 oz/yd gave the best compromise of initial color and retention on weathering.
5. Prewet 24 formulation based on AOC P 920-300 DCPD end capped polyester resin 14 with 18-25 pphr fillers such as kaolin clay, calcium carbonate or combinations of calcium carbonate and clay; [The most used mixture is 14.25 pphr of Wilklay SA-1 kaolin clay and 14.25 pphr of Hubercarb W3 calcium carbonate] 1 pphr of internal release [Axel IntPul 24] and 0.9 part of peroxide initiator(s) [three initiators were used—a low temperature, mid temperature and high temperature combination (luperox 223V75, tertiary amyl peroxyethylhexanote, and tertiarybutylperoxybenzoate) in a 6:2:1 ratio].
6. A topcoat resin 14 with the same ingredients and ratios except the fillers are removed.

Holinee mat is pulled through a prewet 24 station with an exit slot 50 width of 0.036+/−0.003 inches. The prewet 24 station is supplied with sufficient resin 14 such that the reservoir within the prewet 24 station remains full and resin 14 does not exit the input slot 50 where the mat enters the prewet 24 station. This input flow is determined for each prewet 24 station from calibration runs of Mass flow versus flow setting, the size of the part 40 and the amount of resin 14 being transferred to the donor layer.

Calibration Method:
1. Weigh 3 containers
2. Set flow gage on prewet 24 pump to setting A
3. Pump resin 14 into Container for 2 minutes
4. Reweigh container and calculate mass flow (weight/min)
5. Repeat step 2-4 for settings B and C
6. Using results, plot chart of mass flow versus setting for particular pump/prewet 24 station combination
7. Using chart and weight requirements for donor layer select setting for prewet 24 pump which is balanced to output requirement.

Figure 1:
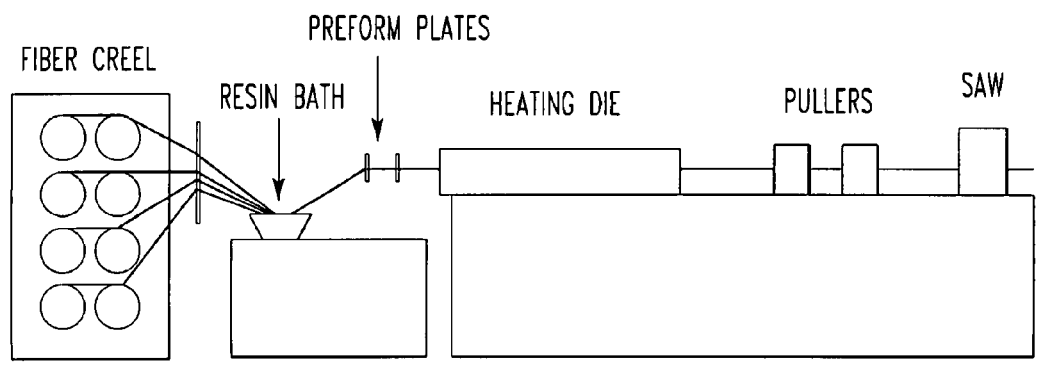
FIG. 1 is a schematic diagram of the pultrusion process.

Referring to FIG. 1, the pultrusion process, very similar to extrusion, is the only continuous process for the production of composite profiles. In pultrusion, reinforcing materials (glass, Kevlar or carbon fibers) in the form of continuous rovings, mats and other types of fabrics, are pulled through a resin 14 matrix bath or other impregnation device, then carefully guided through a pre-shaping station followed by a heated, high precision, die in which the resin 14 matrix sets at high temperature to form the final product. Finally, the hardened profile is continuously pulled past a saw, activated to cut it into pre-determined lengths.

Pultruded Composites

A pultruded composite is generally made up of reinforcing materials (glass, Kevlar, carbon fibres) held together by a rigid resin 14 matrix (polyester, vinylester, epoxy thermosetting resin 14). Often, surface veils are incorporated to improve weathering and corrosion resistance.

Figure 2:
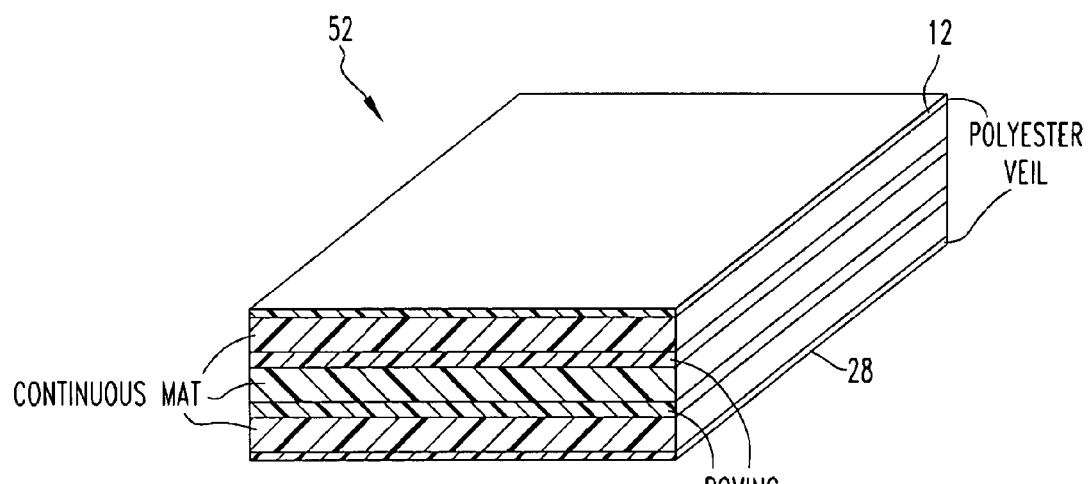
FIG. 2 shows a section of a pultruded profile.

FIG. 2 shows a typical section 52 of a pultruded profile for general use.

Figure 3:
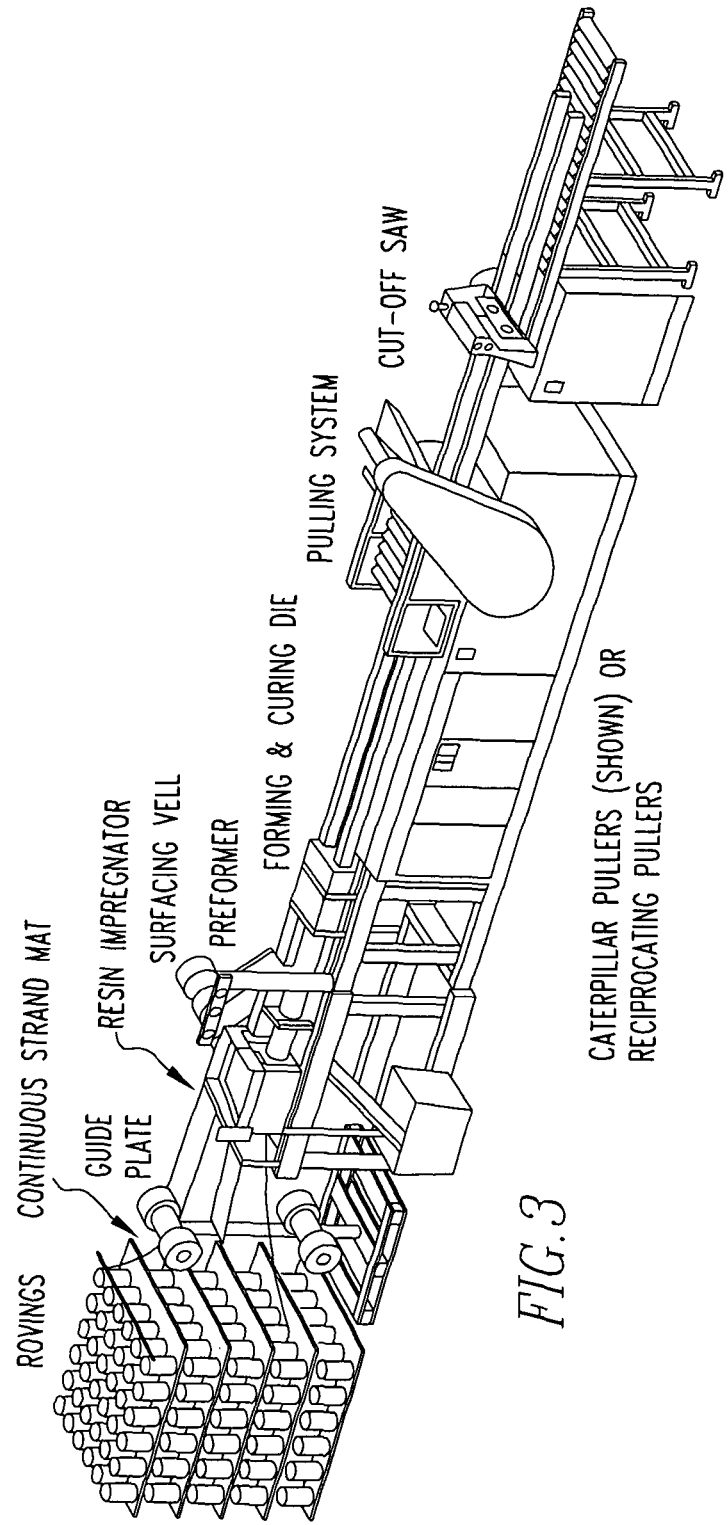
FIG. 3 is a schematic of the basic pultrusion process.

While pultrusion machine design varies with part 40 geometry, the basic pultrusion process concept is described in FIG. 3.

The creels position the reinforcements for subsequent feeding into the guides 48. The reinforcement must be located properly within the composite and controlled by the reinforcement guides 48.

The resin 14 impregnator 26 saturates (wets out) the reinforcement with a solution containing the resin 14, fillers, pigment, and catalyst plus any other additives required. The interior of the resin 14 impregnator 26 is carefully designed to optimize the "wet-out" (complete saturation) of the reinforcements.

On exiting the resin 14 impregnator 26, the reinforcements are organized and positioned for the eventual placement within the cross section form by the preformer. The preformer is an array of tooling which squeezes away excess resin 14 as the product is moving forward and gently shapes the materials prior to entering the die. In the die the thermosetting reaction is heat activated (energy is primarily supplied electrically) and the composite is cured (hardened).

On exiting the die, the cured profile is pulled to the saw for cutting to length. It is necessary to cool the hot part 40 before it is gripped by the pull block (made of durable urethane foam) to prevent cracking and/or deformation by the pull blocks. Two distinct pulling systems are used: a caterpillar counter-rotating type and a hand-over-hand reciprocating type.

The entire part 40 of the invention that is being described takes place from the exit of the guide plate to the entrance of the curing die. The rest of the pultrusion process is essentially unchanged.

Figure 4:
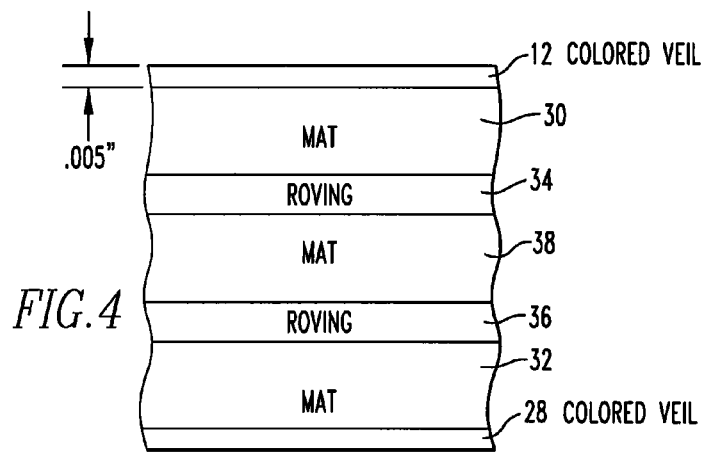
FIG. 4 shows the relative thickness of the layers of pultruded section.

FIG. 4 shows the relative thickness of the various layers of the pultrusion. The outer layer is formed of the colored veil which is thinner relative to the inner layers. As an example, the thickness of the colored veil layer is about 0.005 inches.

Figure 5:
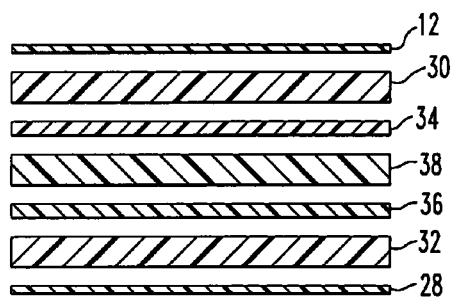
FIG. 5 shows a seven layer laminate.

FIG. 5 shows a cross-section of a seven layer laminate. The impregnated outer mat layers will take on the combined color (appearance of the glass composition and of the filler resin 14). The central roving mat roving layer takes on the color of the filler resin 14, which can be off white. The veils are the color they are dyed.

Figure 6:
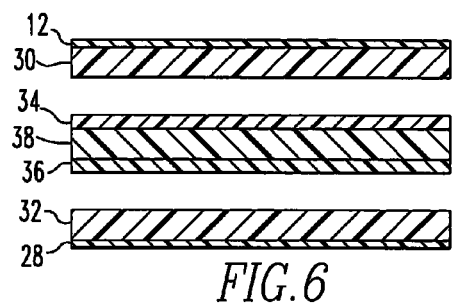
FIG. 6 shows through a three layer laminate.
Figure 7:
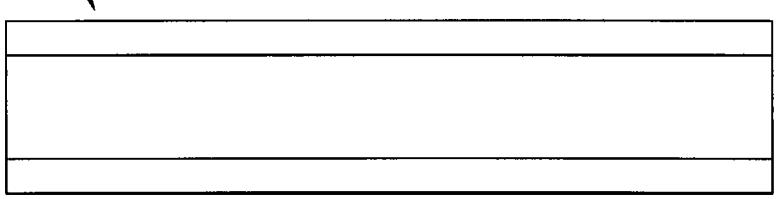
FIG. 7 shows a side view of the pultrusion piece.

FIG. 6 is a cross-section of a three layer laminate. The colored veil outer layers can have the color they are dyed, while the mat layer in contact with the outer veil layer can be slightly green. The inner rovings and mat layers are saturated with filler resin 14 and can be white. The colored veil and mat layers are typically 0.024-0.030 inches thick while the inner rovings and mat layers are typically 0.065-0.070 inches thick. The overall thickness of the laminate is typically between 0.113-0.130 inches thick. The formed laminate of FIG. 6 is shown in FIG. 7.

Figure 8:
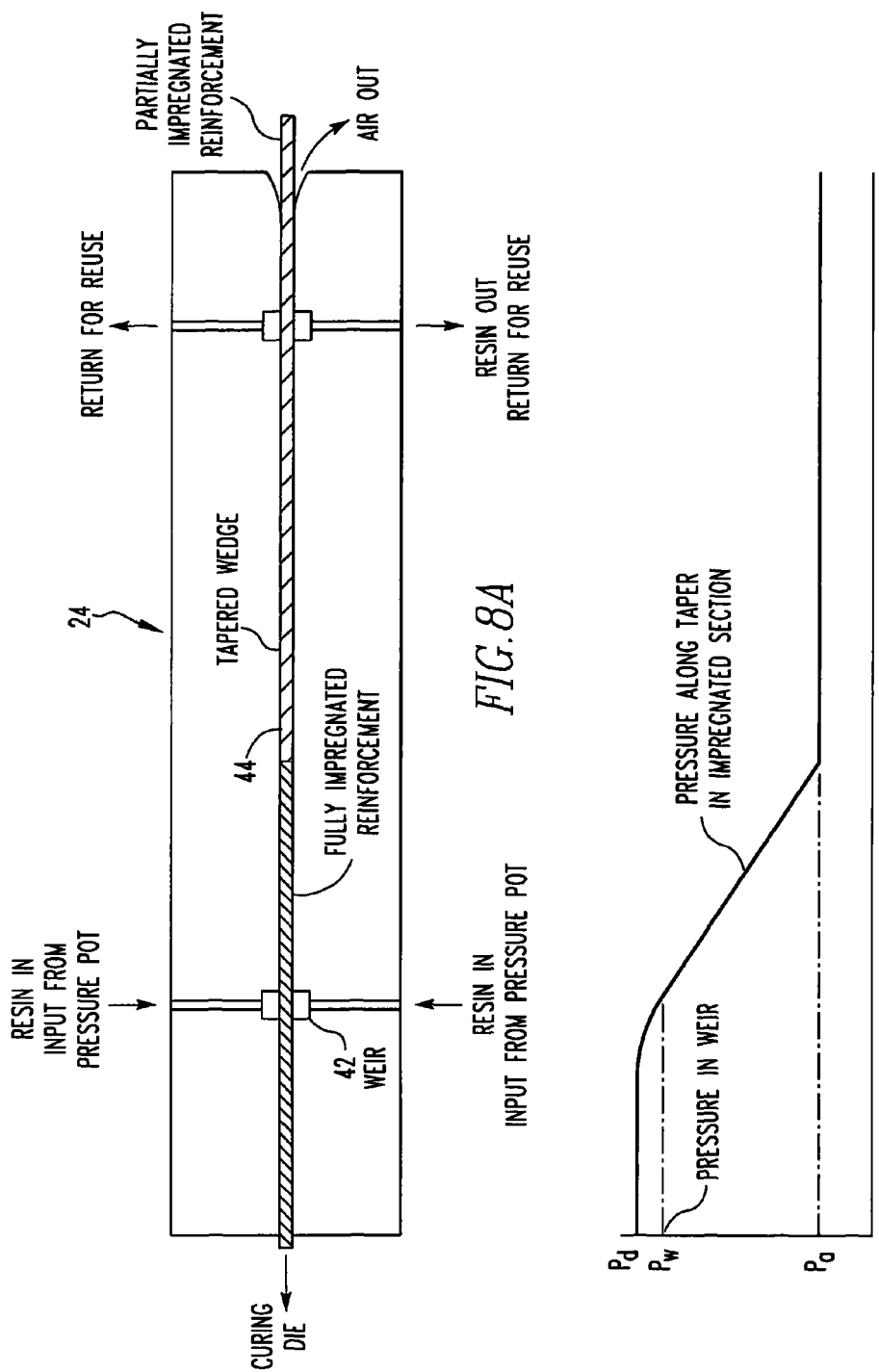
FIG. 8a shows a preform injection design.
FIG. 8b shows a graph of the pressure in the weir versus the pressure along taper in impregnation section.

Referring to FIGS. 8a and 8b, they are a schematic of a generalized injection die with resin 14 overflow return lines. The objective of the impregnation die is to finish the impregnation of the reinforcement pack started by the prewet 24. In order to do this the impregnation die is designed with a slight taper. The taper compacts the reinforcement pack such that the prewet 24 resin 14 in the donor mat is transferred to the acceptor layers of the reinforcement pack while leaving the outer layers (mat and colored veil unimpregnated and available to accept resin 14 from the weir 42 and act as a continuous path for air removal from the reinforcement pack within the injection die to the atmosphere. By carefully designing the thickness tapers of the injection die such that the minimum thickness is equivalent to the thickness the reinforcement pack would be compacted to within the curing die and this thickness occurs at the downstream end of the weir 42 (resin 14 input device) a pressure gradient is set up within the impregnated area of the reinforcing pack which forces the flow of fluid (air and/or resin 14) toward the entrance of die. As long as an uninterrupted path is maintained between the leading edge of the resin 14 in the wedge 44 and the entrance of the impregnating die air will flow out of the entrance of the die and no voids will enter the curing die. If however too much prewet 24 is applied to the donor layer and or the design of the taper in the injection die is incorrect and resin 14 blocks the outer layers of the reinforcing pack, air with be trapped in the pack and transferred to the curing die where it will form either a blister or crack in the cured laminate as it exits the curing die. The prewet 24 is designed by controlling pressure and dimensions to transfer limited amounts of resin 14 so that as the partially impregnated reinforcing pack is compacted in the injection die taper there is insufficient volume of resin 14 to impregnate all the layers between the donor layer and the die surface. The injection die is designed so the taper is continuous and gradual so that transfer from donor layer to acceptor layers would be uniform. Both designs are balanced so that the result is a system which allows for continuous air removal as the final part 40 of the reinforcing pack is impregnated with the topcoat resin 14 in the impregnation die.

FIG. 8A shows a cross-sectional side view of the preform injection die design. Partially impregnated reinforcement enters the right side of the preform. Air that is carried into the preform with the reinforcement also escapes back out the opening. Excess resin 14 that is squeezed out of the reinforcement is collected and returned for reuse through openings in the preform near the entrance. The slot 50 through which the reinforcement passes forms a tapered wedge 44 in the die starting essentially at about its center. The fully impregnated reinforcement passes through the weir 42 which receives resin 14 under pressure that is inputted from a pressure pot. After the impregnated reinforcement passes through the weir 42 and receives the resin 14 in the weir 42, it passes out of the preform and moves to the curing die. FIG. 8B shows the pressure in the die of the preform as a function of location in the die. The pressure is highest between the weir 42 and the exit, where it is essentially constant, or slightly increasing. The pressure before the weir 42 is essentially of a constant slope increasing along the tapered wedge 44. Before the tapered wedge 44 the pressure is essentially constant in the die and about that of atmospheric pressure.

The weir 42 has the following constraints.
1. It must be of a size to transfer sufficient resin 14 to the part 40 to fill the unwet layers (width fixed by 3. below, this normally set depth— (the Q in the slot 50 should be higher than the required Q to wet the part 40).
2. It must be of sufficient length such that the entire perimeter of the part 40 is wet.
3. A guideline that contact time of 1 second would be good however it is preferably 0.5 secs. contact time=weir 42 width/line speed for example a one inch wide weir 42 run at 100 inches per min would have a contact time of 1/100 minutes or 0.6 seconds
4. It can't be too wide; otherwise, the veils catch and roll inside the weir 42 and there can be no dead spots where material could accumulate and cure. (This defines shape.)

A clear distinction between the composition of resin 14 in the rovings layers and the composition of resin 14 in the outer mat layers is maintained by the physics of the process. It ensures the resin 14 without filler in the outer mat layers is not mixed with resin 14 with filler from the donor layer so the increased weatherability of the rail 16 produced is maintained.

Because the resin 14 and filler from the donor layer in the rovings layer is there first and the pressure required to move it is higher than the back pressure along the unimpregnated outer mat—resin 14 from impregnation weir 42 follows a path—the one of least resistance-only into the outer mat layers.

The compaction of the reinforcing pack has already pushed the resin 14 in the central donor mat into the acceptor roving layers. This process occurs prior to the external veil and roving seeing the high pressure resin 14 at the weir 42. With a taper of 0.003 in/in and thickness at the weir 42 of <0.001 in larger than the final dimensions in the curing die, all but the final 2 mils of compaction of the donor layer occurs before 5 inches behind the weir 42. This means that the resin 14 from the donor layer should have reached within 0.002 inches of the outside edge of the roving layer.

Referring to FIGS. 2, 4, 5, and 6 because there is control where the prewet 24 resin 14 and the topcoat resin 14 goes within the part 40 the cross section of a part 40 made with this type of process is easily distinguished from a part 40 made by conventional wetting methods. This is especially true with systems where a pigmented veil is used as the source of color within the part 40. If one polishes the cross section of a ladder rail 16 using normal polishing methods (reference) the layers of reinforcement within the part 40 are visible by optical microscopy, The layers may be separated by machining away layers and leaving a specific layer exposed on the surface of the part 40. Each layer may be isolated and visually examined and/or examined using other instrumented or non-instrumented methods (burn off to determine if the outer layers have filler). One skilled in the art can look at the cross section and see if some form of colored veil is contained in the process even without help of the microscope. Thus, samples of ladders manufactured by competitors who would ignore this patent could be found out with minimum difficulty in the laboratory and even be screened by visually looking a cut edges of the rail 16 without destroying the part 40. A diamond or carbide cut off saw is used to create a 1 thick piece of the section 52. This section 52 is put in clear epoxy resin 14; cure and polish the surface of the cast segment—using techniques developed for polishing metal surfaces for grain analysis. The polished surfaces can be looked at under optical microcopy and each layer distinguished as to type. Because the topcoat resin 14 and prewet 24 resin 14 formulas are different colors their location within the thickness can be observed. In most cases, the resin's 14 interface at the roving/outer mat interface is easily seen. Sample preparation techniques are described in Preparation and Examination of Aluminum Samples for Failure Analysis. By. Brad Peirson. School of Engineering. Grand Valley State University. Laboratory Modules 1 & 2. EGR 250 Materials Science, incorporated by reference herein.

Figure 13:
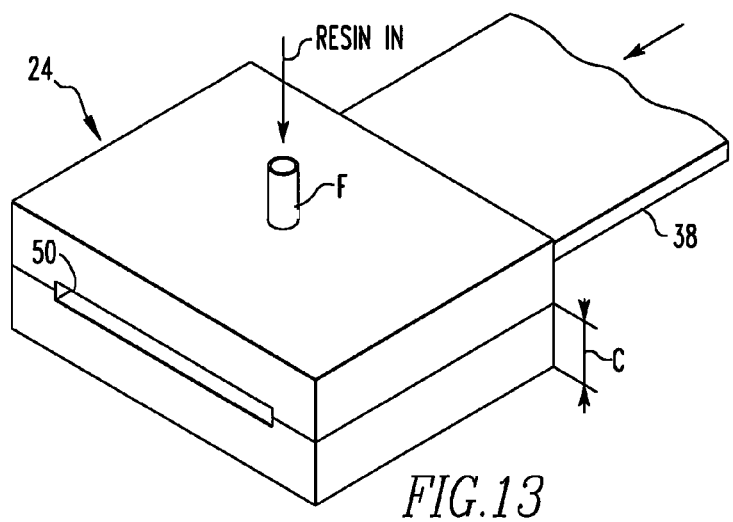
FIG. 13 shows a prewet station.

FIG. 13 shows a perspective view of the prewet 24 station, with the slot 50 being the fixed version. Critical issues regarding the use of the prewet 24 station are the following.

Figure 16:
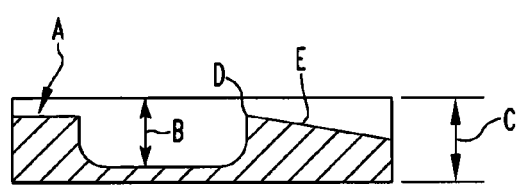
FIG. 16 shows a side sectional view of the pre-wet station.

1. The slot 50 is fixed between the uncompressed thickness of reinforcement and thickness required for maximum transfer to the section 52.
2. The transfer is controlled by input mass flow and ability of keeper D to prevent flow out the rear of the die.
3. As long as the input mass flow and output on the reinforcement through slot A is balanced, a constant amount of resin 14 will be transferred to the donor reinforcement.
4. Slot A may be a constant thickness or changed in thickness to match the needs of the receptor layers for resin 14 along the width of the part 40. Letter A, as shown in FIG. 16, is one half the height of the slot. In all cases the keeper D is less than the either Q or R, whichever is smaller. This forces the flow forward.
5. The resin 14 transfer is varied with speed by adjusting mass flow input from pump or pressure in the tank.

Figure 15:
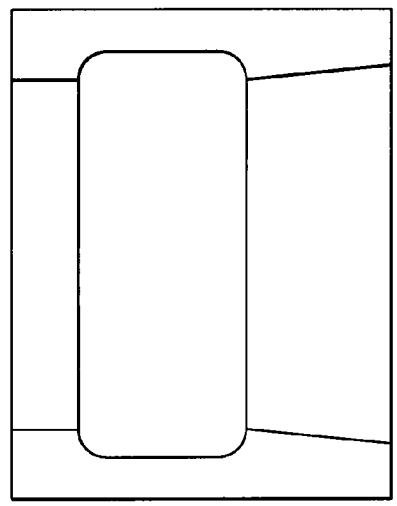
FIG. 15 shows a top view of the internal bottom half of the prewet station.

FIG. 15 shows a top view of the bottom half internally of the prewet 24 station.

Figure 14:
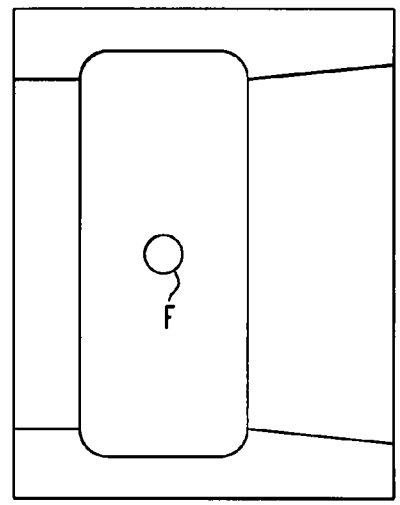
FIG. 14 shows a bottom view of the internal top half of the prewet station.

FIG. 14 is a bottom view of the top half internally of the prewet 24 station.

FIG. 16 is a side view of a cross-section of the bottom half of the prewet 24 station, A equals one half the height of the slot,
B equals one half the depth of the reservoir,
C equals one half the height of the prewet 24,
D equals half the height of Q or R, whichever is smaller, and to minimize backflow,
E is the entrance to the taper,
F is the resin entrance.

Figure 19:
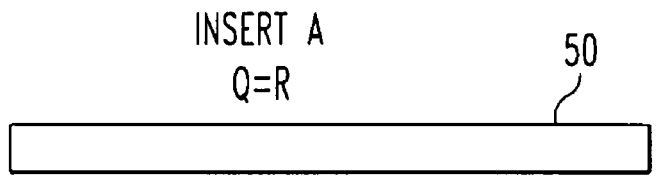
FIG. 19 shows a front view of the slot where Q equals R.
Figure 18:
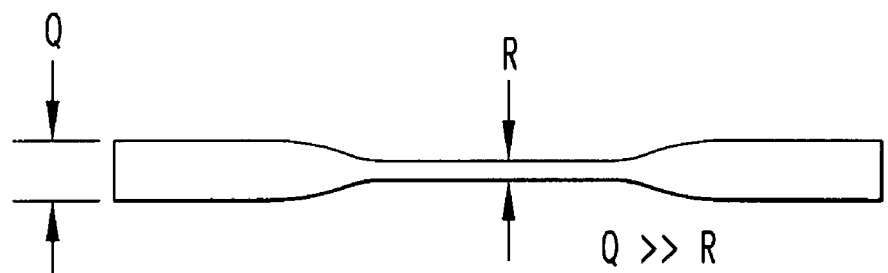
FIG. 18 shows a front view of the slot where Q is much greater than R.
Figure 17:
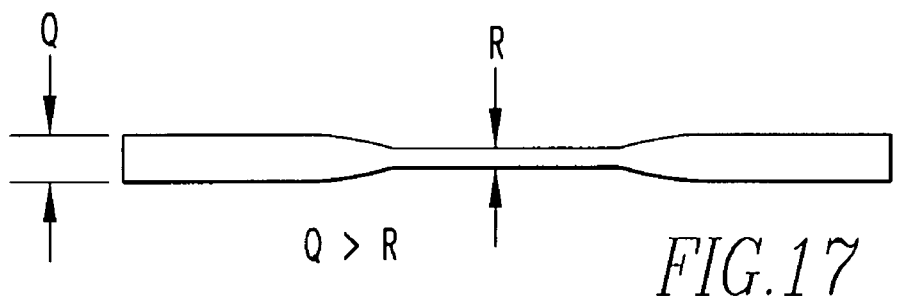
FIG. 17 shows a front view of the slot where Q is greater than R.

Explanation of the drawing of the three types of slots 50, is shown in FIGS. 17-19.

If you look at the type of "U" channel Werner makes, they can be broken down into three categories: heavy weight extension and step rail 16, light weight extension rail 16 and light weight step rail 16. The characteristics of each type of rail 16 is that they are all standard seven layer laminates with the same thickness of veil and mat. What is changed is the amount and distribution of roving throughout the width of the part 40.

In the heavy duty step and extension rails 16, the amount per inch of roving in the flange areas of the U channel are much greater than the relative amount per inch in the web 18. [Section 57821 would be typical of this type of rail 16. The flange thickness is 0.222 inches of which 0.154 in of the thickness is two 0.077 in roving layers. The web 18 of this section is 0.165 inch thick. It contains two roving layers of 0.0485 in thickness.] Thus, the center donor mat must transfer almost twice the volume per in. of resin 14 into the flange areas of the acceptor layers as it transfers into the web 18 area of the acceptor layers in order to fully saturate both areas equivalently without putting excess resin 14 in the web 18 area which could cause air entrapment in the injection die.

The drawing of the slot 50 with much thicker outside segments represents the method by which this distribution of resin 14 within the donor mat is achieved. The mat would be fully saturated in the prewet 24 in its uncompressed thickness. The mat would then be differentially stripped by the slot 50 and allowed to return to its uncompacted state as it exits the prewet 24 die. Air would replace the resin 14 that was removed by the stripping action of the slot 50 as the mat returns to its natural thickness. By stripping more from the web 18 than the flange sections of the donor mat the proper distribution of resin 14 is developed such that there is sufficient resin 14 available in the proper location to fully impregnate the acceptor roving layers even though the layers are not uniform across the width of the part 40.

The slot 50 with slightly larger outside segments acts the same way as the previous slot 50 and used for light weight extension rails 16 such as 62418 where the flange roving layers are about 30% greater in thickness than the web 18 layers.

The uniform slot 50 is used for lightweight step rail 16 where the web 18 and the flange are essentially equal in thickness and roving layers are almost uniform across the part 40 width. Part 63101 is an example of this.

In all cases, the slot 50 design is such that as the donor mat exits the prewet 24 it contains the proper amount of resin 14 that when the reinforcement pack is compress by the injection die to within mils of its final thickness in the curing die sufficient resin 14 will be transferred from the donor mat to the acceptor rovings so that the acceptor rovings are fully saturated with prewet 24 resin 14.

All the design calculations for slot 50 thicknesses and distribution along the width are done by looking at the designs of the sections 52 and understanding the thicknesses to which various materials will compress under the pressures induced in the curing die during the pultrusion process. A. McCarty and J. G. Vaughan, A Pressure Rise Inside a Cylindrical Pultrusion Die for Graphite/Epoxy Composites, @ Polymers and Polymer Composites, 8 (4) 231-244, 2000. Brief, incorporated by reference herein, discusses the pressure distribution within the curing die. Microscopic analysis of layer thicknesses has also helped establish these numbers. The calculation now becomes a simple mass balance assuming that no air is allowed into the final product (void volumes in pultrusions are normally less than 1% for injection die parts). Volumes of resins 14 are converted into thickness of donor mat and slots 50 are designed accordingly. The key to making it all work is to not oversaturate the donor or overcompress the donor acceptor package prior to the curing die.

Figure 9:
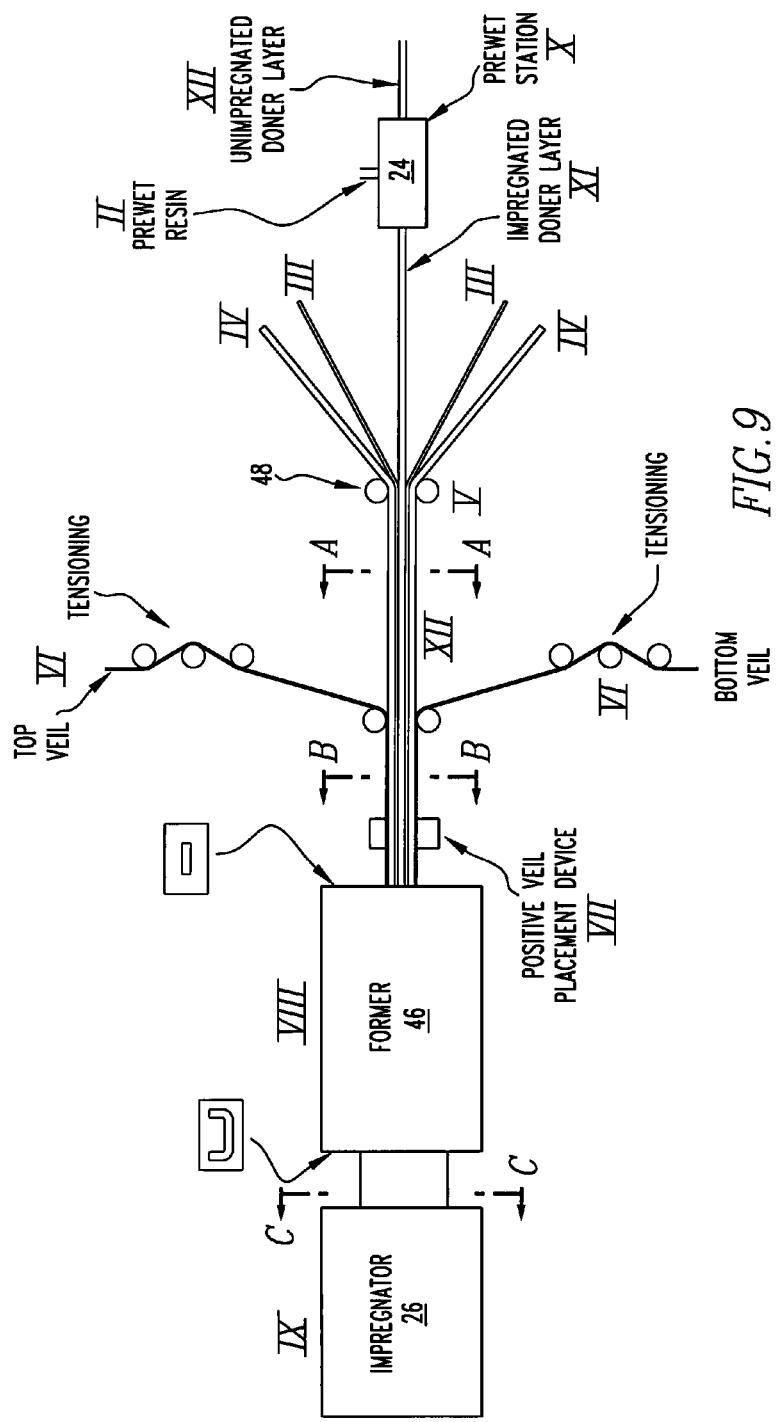
FIG. 9 is a schematic of the controller impregnation.

Referring to FIG. 9, unimpregnated middle mat (I) is pulled at constant speed through prewet 24 station (X). Prewet 24 station (X) is supplied with a controlled mas flow of prewet 24 resin 14 (II) which is balanced to the resin 14 requirements of the section 52 and set by the operator using calibrated flow guidelines described previously. The impregnated donor layer (middle mat) (XI) exits the pulling station X and is combined (stacked) with top and bottom roving layers (III) and top and bottom mat layers (IV) using the first of two horizontal and vertical positioners (V). The combined section (XII) proceeds to second horizontal vertical position V at which the outside veils (VI) are added to the top and bottom of the pack. The pack continues to positive veil placement device (VII) which folds the lower veil around the outer edges of the pack and over the edges of the top veil. (For colored veil, this prevents any non-colored reinforcement from being visible on the surface of the part 40 and causes the overlap of the top and bottom color veils to occur at a constant position and with a constant amount of overlapped area.)

The positive placement device is congruent to the entrance of the part former (VIII). As the pack continues through the part former (VIII), the pack is folded from a flat section 52 to a "u" channel shape. During that change in geometry, the pack is compressed slightly but not stretched (mats would tear).

From the exit of the folder, the "u" shape pack enters the "tapered" impregnation chamber IX. Where the top coat resin 14 is added and remaining air removed as described by Gauchel and Lehman. (The key to this on any other process that uses injection is the placement of the resins 14 such that air is forcibly removed from reinforcement pack.) Continuous path(s) for air removable must be maintained or blisters will be evident on the final part 40. Both continuous strand mat and unwet roving act as paths for air from the impregnation weir 42 in the impregnation (IX) to the space between the entrance of the impregnator 26 and the exit of the folder. For a properly running impregnation system, the outer layers of the reinforcing package at this position should remain free of resin 14, so air can be removed. For thin parts such as window lineals ran at high speed, the air sounds like a train as it rushes out of the back of the impregnating die. Parts 40 may be as thin as 0.040 inches in wall thickness on a closed hollow section 52.

FIG. 9 shows a schematic of the controller impregnation. The unimpregnated donor layer enters the prewet 24 station where prewet 24 resin 14 is introduced. The now impregnated donor layer passes out of the prewet 24 resin 14 station where it is joined with the un-impregnated top mat layer, a top roving layer, the bottom roving layer and the bottom mat layer. Horizontal and vertical layer placement guides 48 guide the different layers together to the impregnated donor layer, As they are pulled along, the top veil and bottom veil layers are added to them which are again guided by horizontal and vertical layer placement guides 48. A top veil and bottom veil has tensioning guides 48 to maintain the tension on the top and bottom veil layers. All the layers then pass through a positive veil placement device and then enter the former 46. The cross-section of the slot 50 through which the layers enter the former 46 is essentially rectangular while the cross-section of the slot 50 from which the layers exit the former 46 has a C shape. The former 46 converts the flat with or cross-section of the layers to a C channel cross-section and partially compacts the layers to initiate a transfer of resin 14 from the donor layer to the acceptor layers. From the former 46, the layers move to the impregnator 26. The impregnator 26 has a tapered cross-section. High-pressure resin 14 is impregnated into the layers at the weir 42 located just next to the point of maximum compaction. The resin 14 is injected into the weir 42 for wetting the outer layers, as described above.

Figure 10:
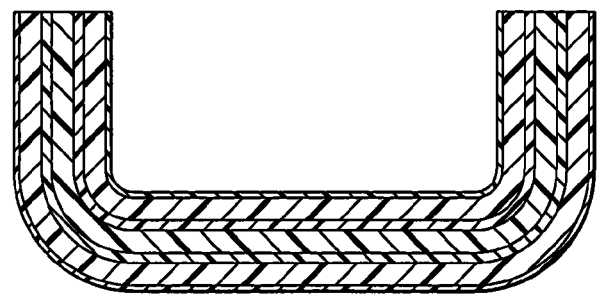
FIG. 10 shows section C of FIG. 9.
Figure 11:
FIG. 11 shows section B of FIG. 9.
Figure 12:
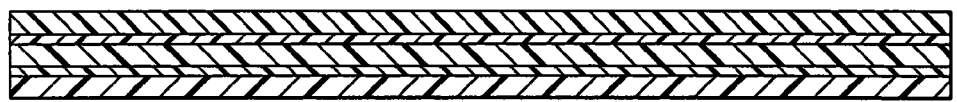
FIG. 12 shows section A of FIG. 9.

FIG. 10 shows section C of FIG. 9. FIG. 11 shows section B of FIG. 9, and FIG. 12 shows section A of FIG. 9. FIG. 12 shows the five layers that have been brought together at that point of the process. The saturated middle mat 38 with resin is the donor layer and the proving layers 34, 36 on each side of the middle mat 38 are acceptor layers.

Prewet 24 Station Variable Slot Version

Figure 20:
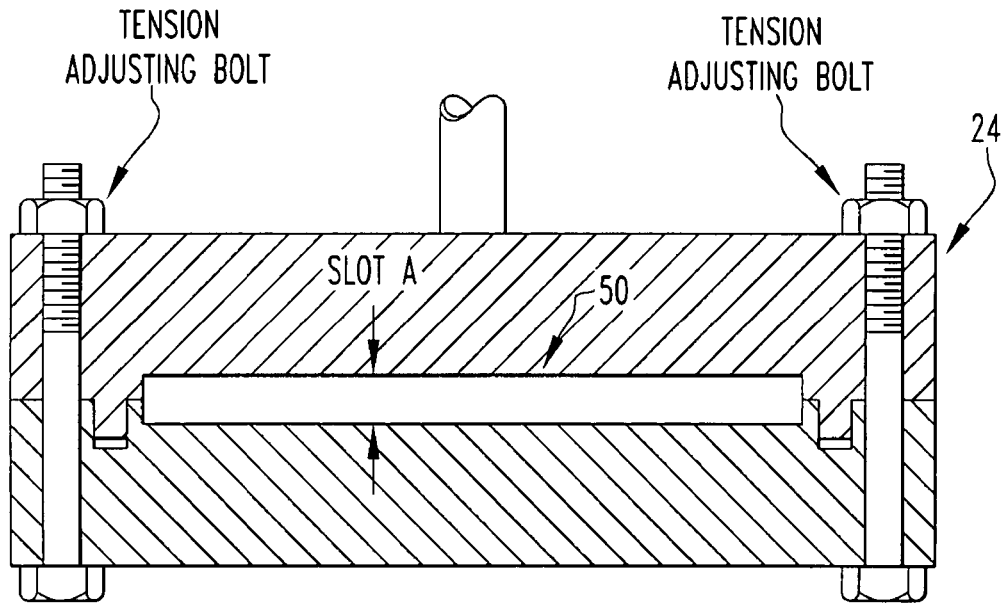
FIG. 20 is a front view of a prewet station with a variable slot version.
Figure 21:
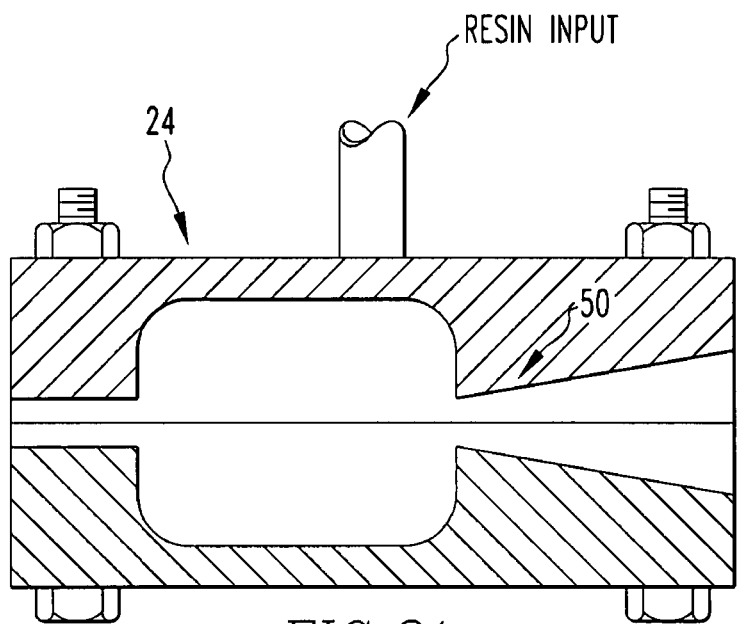
FIG. 21 is a side view of a prewet station with a variable slot version.

Referring to FIGS. 20 and 21, slot A is adjustable to different thickness to apply exactly the amount of resin 14 needed. Must be adjusted for each speed or adjusted to maximum speed and allowed to transfer extra resin 14 or start up as speed increases.

Compaction bolts adjust slot A and keeper D as in previous drawing such that resin 14 moves forward out of slot A with reinforcement. Inlet pressure keeps reservoir full on an as needed basis. Pressure or flow rate can be sporadic as long as reservoir has sufficient resin 14 to saturate reinforcement (mat) a sit exits slot A.

Figure 22:
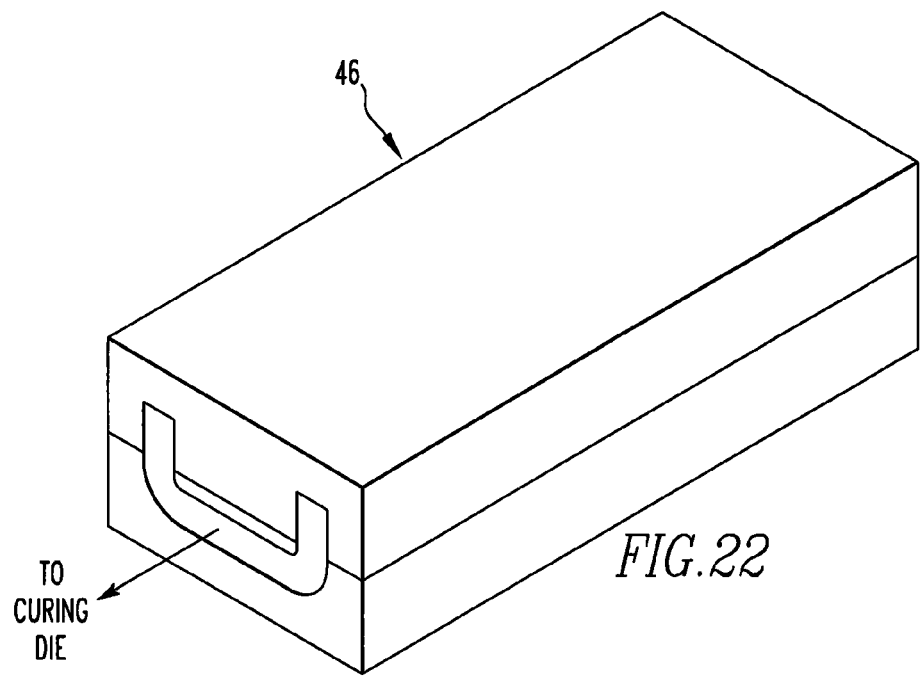
FIG. 22 is a perspective front view of a continuous former.
Figure 23:
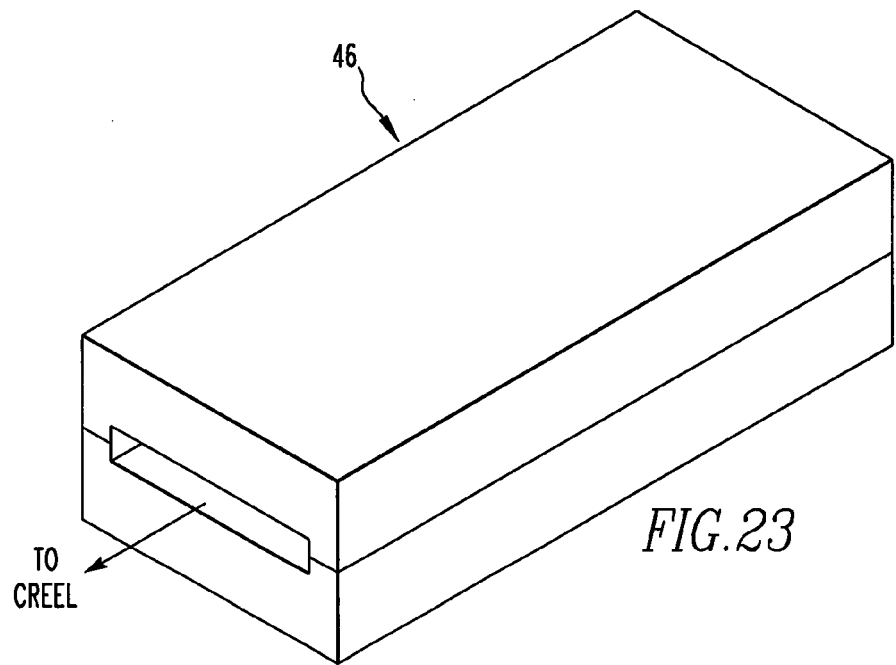
FIG. 23 is a perspective back view of the continuous former.
Figure 24:
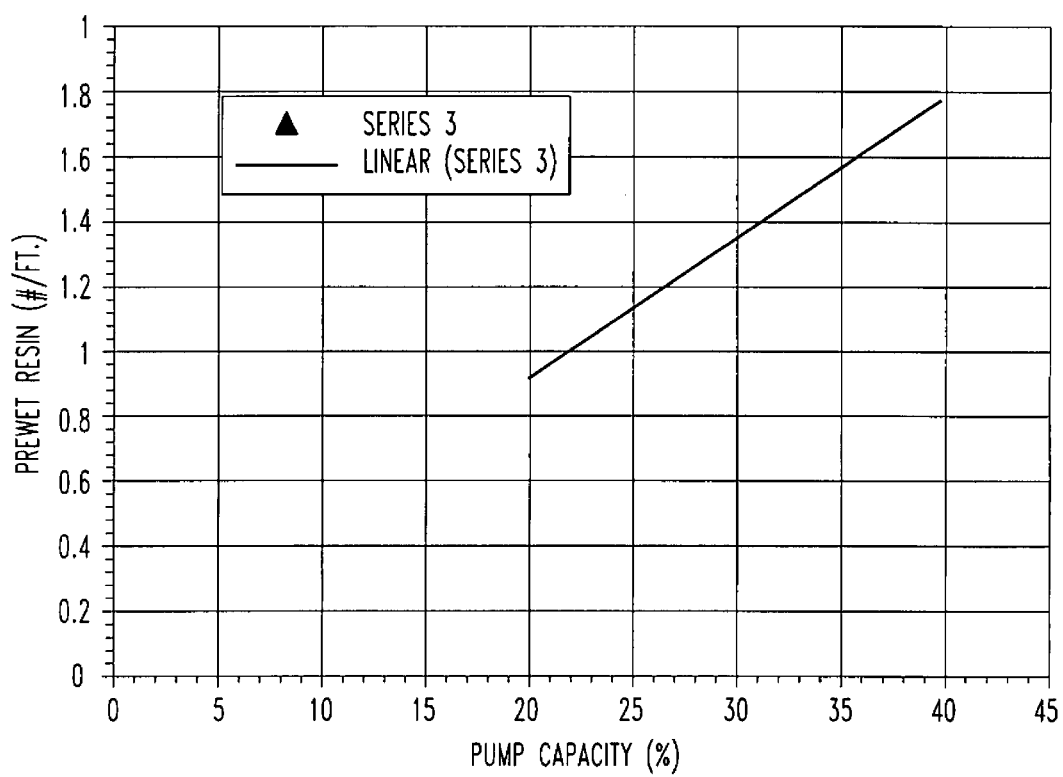
FIG. 24 is a graph of the prewet resin versus the pump capacity.

Referring to FIGS. 22 and 23, there is shown a front view and a back view, respectively, of a continuous former 46. The former 46 converts the flat shaped reinforcing pack to the approximate shape of the formed part 40. The former 46 compacts the reinforcing pack slightly to prevent transfer of prewet 24 resin 14 from the donor layer to acceptor layers. Approximately 30% of transition is accomplished in the former 46. If there is too much compaction, it results in an increased pull the forced by as much as 50%.

The present invention pertains to a method for making a part. The method comprises the steps of using a central reinforcement to carry structural resin 14 and maintain distribution of structural resin 14 through an impregnation process of material to a curing die at a rate of greater than 5 ft/min. There is the step of forming the part.

The present invention pertains to a method for producing components. The method comprises the steps of producing rail 16 at a rate of greater than 5 ft/min having a delta E less than 20 with a 60 degree gloss, as measured by a hunter gloss meter, of greater than 70 after 1000 hours of accelerated weathering in a QUV chamber using bulb A with an ASTM G154 cycle 4. There is the step of cutting the rail 16.

The present invention pertains to a system 10 for producing a ladder rail 16, as shown in FIG. 9. The system 10 comprises a pultrusion system 10 that produces product at a rate of greater than 5 ft/min. The pultrusion system 10 comprises a prewet 24 which wets a middle mat with a resin 14 and filler. The pultrusion system 10 comprises an impregnator 26 which compresses a first veil outer layer 12, a second veil outer layer 28, a first mat layer 30, a second mat layer 32, a first roving layer 34 and a second roving layer 36 with the middle mat, and which wets only the first veil outer layer 12, the second veil outer layer 28, the first mat layer 30 and the second mat layer 32 with resin 14 without filler.

The present invention pertains to a system 10 for producing components. The system 10 comprises means for producing rail 16 at a rate of greater than 5 ft/min having a delta E less than 20 with a 60 degree gloss, as measured by a hunter gloss meter, of greater than 70 after 1000 hours of accelerated weathering in a QUV chamber using bulb A with an ASTM cycle. The system 10 comprises means for cutting the rail 16.

The present invention pertains to a ladder rail 16, as shown in FIGS. 4-6. The rail 16 comprises a first veil layer 12. The rail 16 comprises a first mat layer 30 having a first color in contact with the first veil layer 12. The rail 16 comprises a first roving layer 34 in contact with the first mat layer 30. The rail 16 comprises a middle mat layer in contact with the first roving layer 34. The rail 16 comprises a second roving layer 36 in contact with the middle mat layer and together the middle mat and first roving layer 34 having a second color. The rail 16 comprises a second mat layer 32 having the first color in contact with the second roving layer 36. The rail 16 comprises a second veil layer 28 in contact with the second mat layer 32. The first veil layer 12, and the second veil layer 28 having resin 14 with filler that includes clay and CaCO3.

The present invention pertains to a system 10 for producing a ladder rail 16. The system 10 comprises a pultrusion system 10 that produces product at a rate of greater than 5 ft/min. The pultrusion system 10 comprises a prewet 24 which wets a middle mat with a resin 14 and filler. The pultrusion system 10 comprises an impregnator 26 which compresses a first veil outer layer 12, a second veil outer layer 28, a first mat layer 30, a second mat layer 32, a first roving layer 34 and a second roving layer 36 with the middle mat, and which wets only the first veil outer layer 12, the second veil outer layer 28, the first mat layer 30 and the second mat layer 32 with resin 14 without filler.

In an alternative embodiment, filler is added to the topcoat resin to not only improve performance but help the economics. The presence of the filler, as described below, can be used in all the situations described above. One realizable result is achieving commercial pultrusion speeds of 5-9 ft/min with resulting part production of about 7 ft/min. By adding 5 pph clay and 5 pph carbonate to the filler eliminates speed issues based on pull force increase. The preferred percentage breakdown of the mixture is as follows:

Resin—AOC modified polyeste 100 parts 89.36%
Clay—low oil absorption 5 parts 4.47%
CaCO3—parts 4.47%
Internal release 1 part 0.89%
Low temperature initiator 0.6 parts 0.51%
Midrange initiator 0.2 parts 0.18%
High end initiator 0.1 part 0.09%
Speeds obtained were the same as the original speeds qualified with the RI process 7-7.5 ft per min depending on color. No speed reduction was seen.

In regard to weathering of the part with this filler, the Delta E for a typical unfilled color after 1000 hrs to the ASTM cycle used (see applications for quoted cycle and Delta E values for consistency) is increased by about 20-50% with the 5 parts clay and 5 part carbonate topcoat.

In the filler, levels down to 2 pph for both clay and carbonate had equivalent speed, better weathering but higher costs than the 5 pph levels for each filler. As little as a total 4 parts of filler of which 2 parts were CaCO3 were necessary to maintain speed with a major increase in pulling force. The CaCO3 being large particles not only reduces the shrinkage of the resin but also acts like a ball bearing to maintain a resin thickness between the veil and the die. The clay is too small a particle to effectively maintain a sufficient gap such that the veil doesn't drag or droop to the surface between particles. The mixture is the same as above with 2 parts of each filler and percentages adjusted accordingly.

The effect on ladder performance in either mechanical or electrical testing in accordance to ANSI 14.5 was insignificant. These results were applicable to all colors of veil. An example of such tests are as follows.

| Side rail bending for 6208 orange veil ladder | | |
|---|---|---|
| Load | 1455.9 | 1496.667 |
| Standard deviation | 33 | 34 |
| # of std deviations above rating | 7.66 | 8.75 |

The colored veil material, by the nature of its manufacture, is a glass veil substrate that has been combined and encapsulated with color material resulting in a heavier weight product than uncolored veil and that has its glass fibers coated. The application of using a colored surface veil, with its inherent coated glass fibers, in ladder side rail components results in pultrusions that show less fiber prominence which are smoother and less rough to the touch. This improved surface appearance and feel are beneficial features to the ladder product and in particular the user of the product as the side rails are often the locations of the product which are grasped in service (climbing up and climbing down the ladder).

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A pultrusion method for making a ladder rail comprising the steps of:
   wetting an unimpregnated middle mat layer within a prewetting die with prewetting resin comprising filler;
   forming a seven-layer laminate by successively stacking unwet, unimpregnated top and bottom roving, mat, and veil layers onto the wet middle mat layer;
   compressing the seven-layer laminate so that said prewetting resin comprising filler from said wet middle mat layer fully saturates each of said roving layers and said middle mat layer;
   feeding the compressed laminate to a compacting impregnator compacting the compressed laminate while wetting only the top and bottom mat and veil layers with top coat resin; and
   forming a seven-layer ladder rail by passing the compacted laminate through a curing die at a rate of greater than 5 ft/min.

2. The method of claim 1 wherein the rail maintains a delta E of less than 20 with a 60 degree gloss, as measured by a hunter gloss meter, of greater than 70 after 1000 hours of ASTM G154 cycle 4 irradiation in a QUV accelerated weathering machine.

3. The method of claim 1 further comprising a step of cutting the rail.

4. The method of claim 1 wherein said rate is from 5 ft/min to 9 ft/min.

5. The method of claim 1 wherein said filler includes clay and $CaCO_3$.

6. The method of claim 5 wherein a level of each of said clay and $CaCO_3$ is at least 2 pph of said prewetting resin.

7. The method of claim 5 wherein a level of each of said clay and $CaCO_3$ is at least 5 pph of said prewetting resin.

8. The method of claim 1 wherein said top and bottom mat layers have a first color and said middle mat and one of said top and bottom roving layers have a second color.

9. The method of claim 1 wherein said prewetting resin is selected from the group consisting of polyester, acrylic, epoxy, urethane, acrylate, and combinations thereof.

10. The method of claim 9 wherein said top and bottom veil layers are initially treated by a technique selected from the group consisting of dying, printing, pigmenting, transfer coating, and combinations thereof.

11. The method of claim 1 wherein said top and bottom veil layers are composed of a material selected from the group consisting of glass, polyester, paper, jute, and other dispersed fiber systems.

12. The method of claim 1 wherein said top and bottom veil layers are initially treated by a technique selected from the group consisting of dying, printing, pigmenting, transfer coating, and combinations thereof.

* * * * *